(12) United States Patent
Nagy

(10) Patent No.: US 6,860,720 B2
(45) Date of Patent: Mar. 1, 2005

(54) ROTARY DRIVE USED IN CONJUNCTION WITH A MECHANICAL AND SELF-ENERGIZING COUPLING SYSTEM

(75) Inventor: Sandor Nagy, Hochheim (DE)

(73) Assignee: Siemens Aktiengesellschaft, Munich (DE)

( * ) Notice: Subject to any disclaimer, the term of this patent is extended or adjusted under 35 U.S.C. 154(b) by 26 days.

(21) Appl. No.: 10/448,056

(22) Filed: May 30, 2003

(65) Prior Publication Data

US 2004/0012207 A1 Jan. 22, 2004

(30) Foreign Application Priority Data

May 31, 2002 (DE) .......................................... 102 24 044

(51) Int. Cl.[7] .............................................. F03D 11/00
(52) U.S. Cl. ................................ 415/208.1; 415/211.1; 415/211.2; 415/224; 415/123
(58) Field of Search ........................ 415/4.2, 4.4, 208.1, 415/211.1, 211.2, 221, 224, 123, 907, DIG. 4; 416/DIG. 4; 290/44, 55

(56) References Cited

U.S. PATENT DOCUMENTS

| | | | | |
|---|---|---|---|---|
| 2,403,564 A | * | 7/1946 | Stein ............................ | 290/44 |
| 4,084,918 A | * | 4/1978 | Pavlecka ........................ | 415/1 |
| 4,350,900 A | * | 9/1982 | Baughman .................... | 290/55 |
| 5,083,899 A | * | 1/1992 | Koch ........................... | 415/2.1 |
| 5,375,968 A | * | 12/1994 | Kollitz et al. ................. | 415/2.1 |
| 6,149,544 A | * | 11/2000 | Masberg et al. .............. | 477/13 |

* cited by examiner

Primary Examiner—Ninh H. Nguyen
(74) Attorney, Agent, or Firm—Harness, Dickey & Pierce, P.L.C.

(57) ABSTRACT

A wind power system includes a rotary drive, used in conjunction with a mechanical and self-energizing coupling system. The rotary drive can be used as a wind power system in all areas. The electromagnetic coupling system can be used in all industrial areas, in all areas and types of vehicle technology, and in all electrical engineering areas. The combination of a wind power system with a rotary drive with mechanical and self-energizing coupling system indicates that the wind force can be utilized more effectively than in the case of conventional wind-driven rotors, irrespective of the physical size. This is achieved by virtue of the blade arrangement and the special design of the housing. The self-energizing coupling system furthermore has the physical advantage that the magnet is combined in one space with the iron core and, on the other hand, a short-circuited coil is energized. The current for the electromagnetic coupling may also be taken directly from the generator stage.

22 Claims, 6 Drawing Sheets

ROTARY DRIVE USED IN CONJUNCTION WITH A MECHANICAL AND SELF-ENERGIZING COUPLING SYSTEM

The present application hereby claims priority under 35 U.S.C. §119 on German patent application number DE 10224044.2 filed May 31, 2002, the entire contents of which are hereby incorporated herein by reference.

FIELD OF THE INVENTION

The invention generally relates to a wind power system with a rotary drive in conjunction with mechanical and self-energizing coupling systems.

BACKGROUND OF THE INVENTION

In the case of wind-driven rotors that are used nowadays, only a portion of the incident force of the wind can be used. This is because the wind force passes uniformly on both sides of the blades of the wind-driven rotor. Higher power levels can be expected only by the curvature of the blades.

SUMMARY OF THE INVENTION

In the case of the wind power system according to an embodiment of the invention with a rotary drive, the wind-driven rotor 1 is located in a specially designed housing 2. The housing 2 is designed such that half of the wind-driven rotor 1 rotates in the exposed zone 6. Here, the wind force strikes the blades from the front, and drives them. The other half of the housing 2 is designed such that the wind-driven rotor 1 is located in a wind blocking zone 14, and the incident wind is forced into the wind inlet opening 5 by virtue of the shape of the housing 2.

The wind inlet openings 5 force the air flow of the incident wind into the wind reversal chambers, and deflect it such that it is passed from the rear to the curved blades of the wind-driven rotor. This allows a larger proportion of the energy in the incident wind to be converted to a rotary movement.

The housing 2 can be shaped such that a wind inlet opening 5 passes the air flow of the incident wind into the wind reversal chambers 15, in which a desired number of alignment plates 3 of a desired shape can be arranged. This can be done, for example, in order to drive the blades of the wind-driven rotor 1 in the desired direction.

However, it is also possible to arrange two or more wind inlet openings which use wind reversal chambers 15 and alignment plates 3 to pass the air flow of the wind to the blades of the wind-driven rotor 1 in the desired direction. Furthermore, impact stubs 4 may also be arranged in the wind reversal chambers 15, in order to produce vortices in the air flow of the wind in the desired direction. The number and the shape of the wind inlet openings 5, wind reversal chambers 15 and alignment plates 3 are variable, although their function does not change at all.

In a further variant of the design, separating plates 11 can also be arranged. These prevent the air from being able to escape from the area of one chamber into another, with the air being transported between the blades of the wind-driven rotor 1, instead. Moving wind catchment plates 16 on the wind-driven rotor housing 2 make it possible to use a larger air flow quantity.

The housing 2 with the openings in the wind-driven rotor 1, the exposed zone 6 and the wind inlet openings 5 should, preferably always, be aligned with the wind direction, either mechanically or by remote control. In order to control the internal pressure and hence the power levels, as well as the rotation speed of the wind-driven rotor 1, and to match them for different wind strengths, an adjustable outlet valve 7 may be arranged in order to control the amount of air flowing away.

There is no restriction as to whether one or more outlet valves 7 are installed, or on their type either. The outlet valves 7 can be regulated mechanically, and can be computer-controlled.

Figure 2:
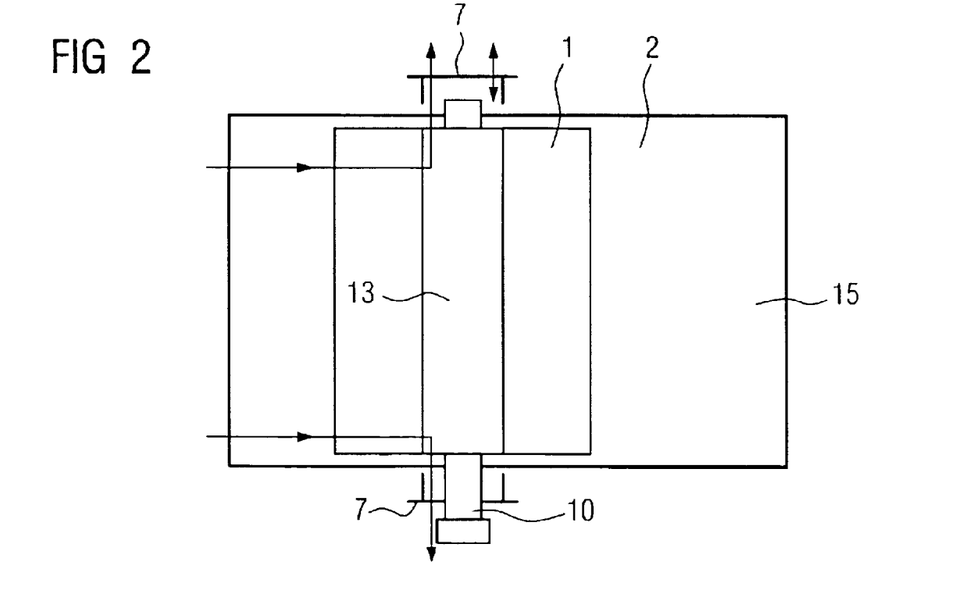
FIG. 2 shows the outline of one design variant of the rotary drive.

In order to speed up the outlet flow of the air flow through the wind outlet channel 8, reduced pressure systems 9 can be arranged. The outlet valve 7 and the wind outlet channel 8 can be arranged on the rear face of the housing, or can be arranged at any other desired point, as shown in FIG. 2. In FIG. 2, the air flow is dissipated through the interior of the rotor of the wind-driven rotor, controlled by the outlet valves 7. In order to produce electricity, a generator 12, or else a multistage generator 17, can be installed in the rotor of the wind-driven rotor, or can be arranged externally. The multistage generator 17 can be connected to all types of mechanical or else self-energizing coupling systems.

The rotary drive can be operated synchronously by reversing the flow direction of the air flow in the area of the wind blocking zone 14. The volume of the air flow which is passed to the wind-driven rotor can be increased by means of wind catchment plates 16. The rotary drive with and without wind catchment plates 16 must always be aligned with the wind direction, either mechanically or by remote control, or else by any type of conventional control system.

The mechanical power which is produced by the rotary drive can be passed to a generator, or else can be used in some other way. All types of mechanical power transmission may be used for power transmission.

Since the outlet valve 7 is adjustable, the running speed of the wind-driven rotor 1 can be controlled and matched to different wind speeds. This controls the power of the wind-driven rotor.

All types of wind-driven rotors or rotors with blades may be used for the rotary drive. The configuration of the blades is variable. The configuration of the housing 2 is likewise variable, with an exposed zone 6 and a wind blocking zone 14. It is also possible to arrange two wind-driven rotors 1 in one housing 2, and independently thereof, one generator or a multistage generator can either be arranged in the interior of the rotor of the wind-driven rotor 1, or else can be connected to the shaft of the wind-driven rotor 1 by any known types of power transmission. The self-energizing electromagnetic coupling system according to an embodiment of the invention can also be used. The self-energizing electromagnetic coupling system may also be used for the connection between the stages of a multistage generator.

The self-energizing coupling can be used wherever it is necessary to step down the rotation speed (for example gas turbines, high-speed motors, etc.). The technology of the rotary drive can be used wherever the wind force is used in order to either produce only mechanical power or else to convert this into electricity as well. It is suitable for large wind power systems or else for small devices which can be used to generate electricity for domestic purposes, for camping, on boats and on ships.

DETAILED DESCRIPTION OF THE PREFERRED EMBODIMENTS

Figure 1:
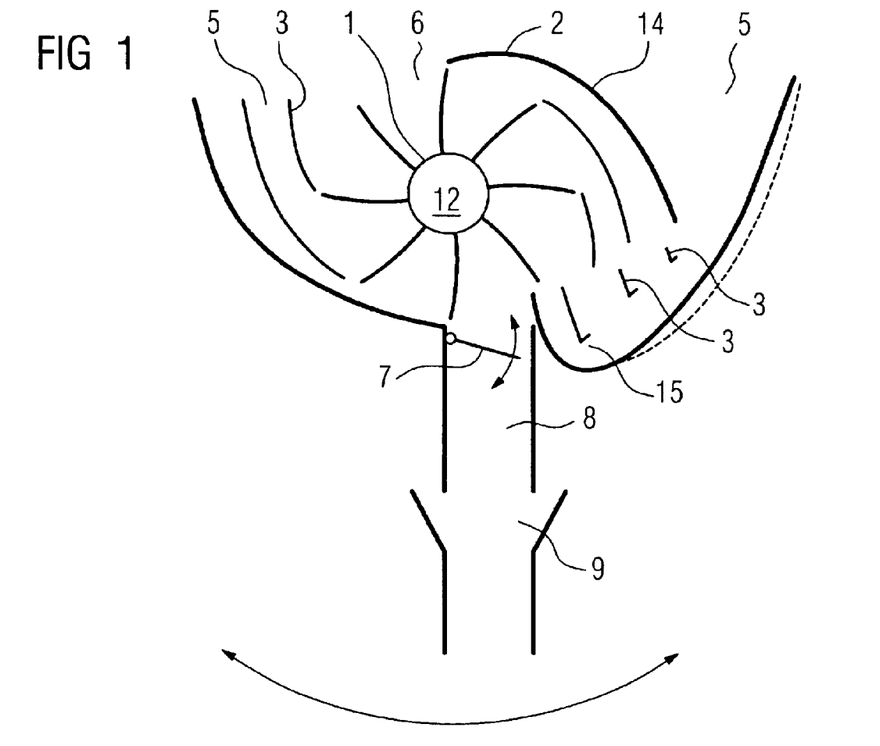
FIG. 1 shows a rotary drive.

FIG. 1 shows a rotary drive in which the wind-driven rotor 1 is shrouded by the housing 2 such that half of it rotates in the exposed zone 6, and the other half is designed to form a wind reversal chamber 15. The housing 2 forms a wind blocking zone 14 over half the wind-driven rotor 1, and prevents the incident wind from acting on the profile of the wind-driven rotor. The arrangement of a variable number of wind inlet openings 5 forces the air flow of the incident wind into the wind reversal chamber 15, where it is deflected such that it is passed from the rear to the blades of the wind-driven rotor 1, and assists the rotary movement of the wind-driven rotor 1.

The alignment plates 3 which are arranged in the wind reversal chambers 15 guide the air flow of the incident wind. The amount of air that drives the wind-driven rotor 1 can escape only through the wind outlet channel 8. The amount of air flow that escapes can be controlled by means of the adjustable outlet valve 7 at the opening of the wind outlet channel 8. This controls the internal pressure, since it controls the amount of air remaining in the wind-driven rotor. The outlet flow of the air through the wind outlet channel 8 can be sped up by means of a reduced pressure system 9 that is arranged in the outlet channel 8.

FIG. 2 shows the outline of one design variant of the rotary drive. The wind-driven rotor 1 has wind flow openings 13 in the interior. The air flowing out is dissipated laterally through the interior of the wind-driven rotor 1. The adjustable outlet valves 7 are used to control the amount of air flowing out. The mechanical power which is produced can be extracted via the drive shaft 10. However, it is also possible to extract the power at some other point.

Figure 3:
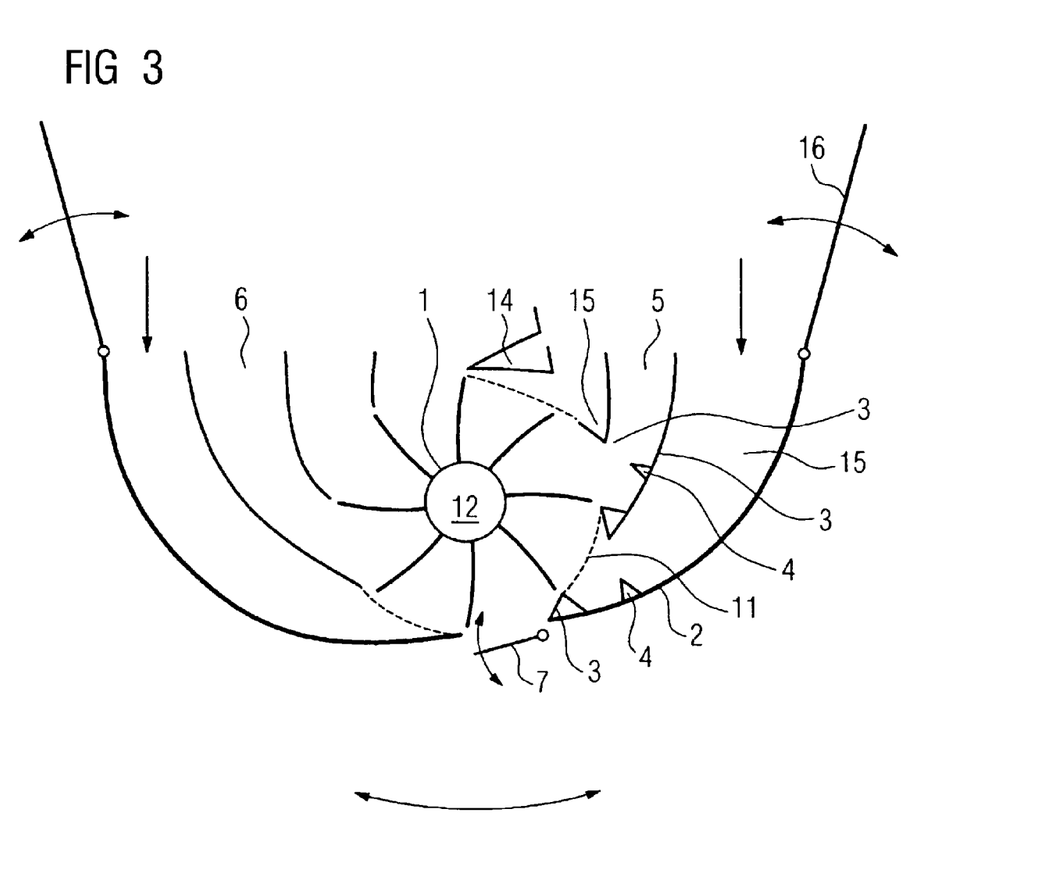
FIG. 3 shows one design variant in which, except for the wind outlet channel area 8 with the outlet valve 7.

FIG. 3 shows one design variant in which, except for the wind outlet channel area 8 with the outlet valve 7, each blade intermediate area of the wind-driven rotor 1 has its own air supply areas in the exposed zone 6 or its own wind reversal chamber 15, thus ensuring that the air supplied to each blade of the wind-driven rotor is always exact. This makes it easier for the rotor to rotate.

This design variant is intended to show that the quantity and the shape of the air supply areas (exposed zone 6 and wind reversal chamber 15) as well as the ratio of the number of air supply areas to the ratio of the number of blades are variable. Furthermore, separating plates 11 are arranged in FIG. 3, which prevent air from escaping in an uncontrolled manner. Only the amount of air which is forced between the blades escapes. Wind catchment plates 16 enlarge the volume of the amount of air which is supplied to the wind-driven rotor, thus also increasing the internal pressure. A generator 12 can be arranged in the interior of the wind-driven rotor 1. Impact stubs 4 cause the air flow to produce vortices in the desired direction.

Figure 4:
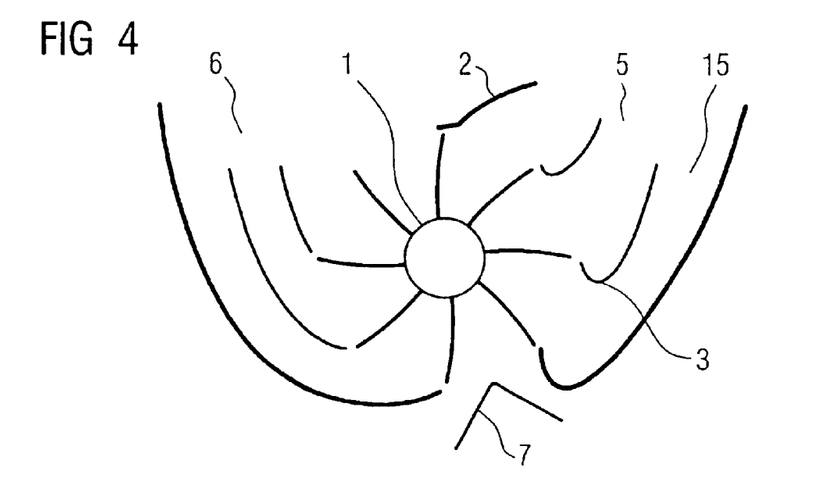
FIG. 4 shows a variable embodiment of the alignment plates 3, although the method of operation remains the same, irrespective of the embodiment.

FIG. 4 shows a variable embodiment of the alignment plates 3. It should be noted, however, that although the method of operation remains the same, irrespective of the embodiment.

Figure 5:
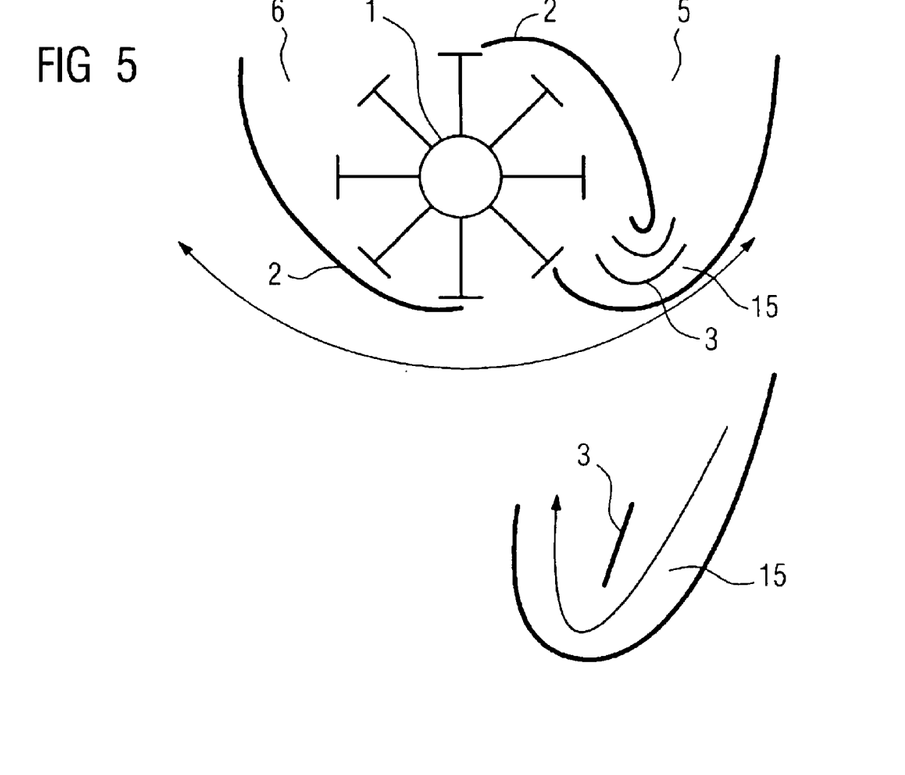
FIG. 5 illustrates that the design of the blades of the wind-driven rotor 1 is variable, as is the number of blades.

FIG. 5 illustrates that the design of the blades of the wind-driven rotor 1 is variable, as is the number of blades. In the design variant in FIG. 5, the housing 2 itself carries out the function of the alignment plates 3, by virtue of its shape. The small illustration explains the principle of operation of the wind reversal chambers 15 and of the alignment plates 3.

Figure 6:
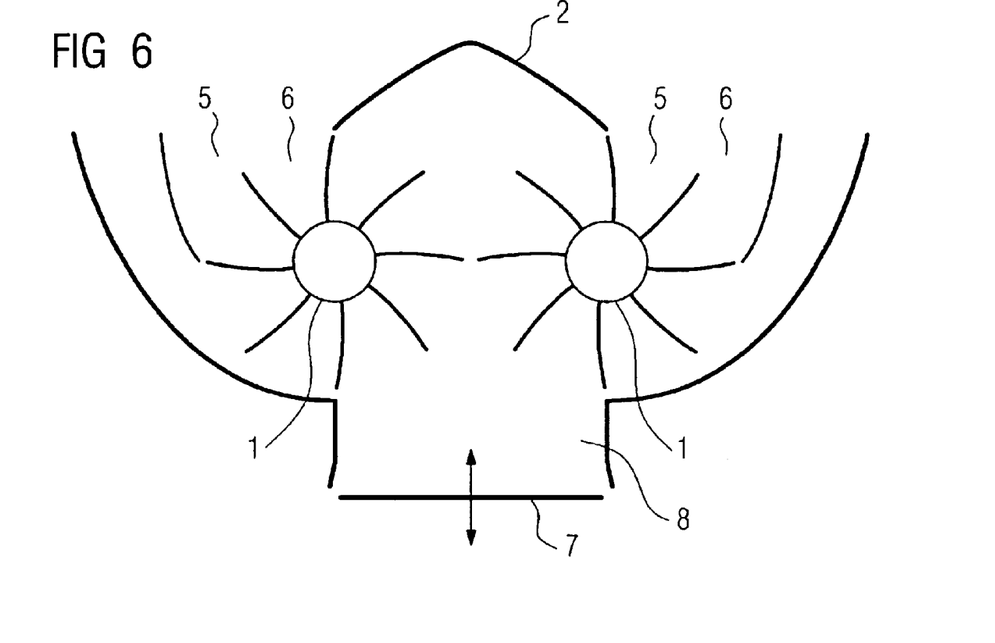
FIG. 6 shows the design option in which two wind-driven rotors, with a wind channel 8 and an adjustable outlet valve 7, are arranged in one housing 2.

FIG. 6 shows the design option in which two wind-driven rotors. In the design option, a wind channel 8 and an adjustable outlet valve 7 are arranged in one housing 2.

Figure 7:
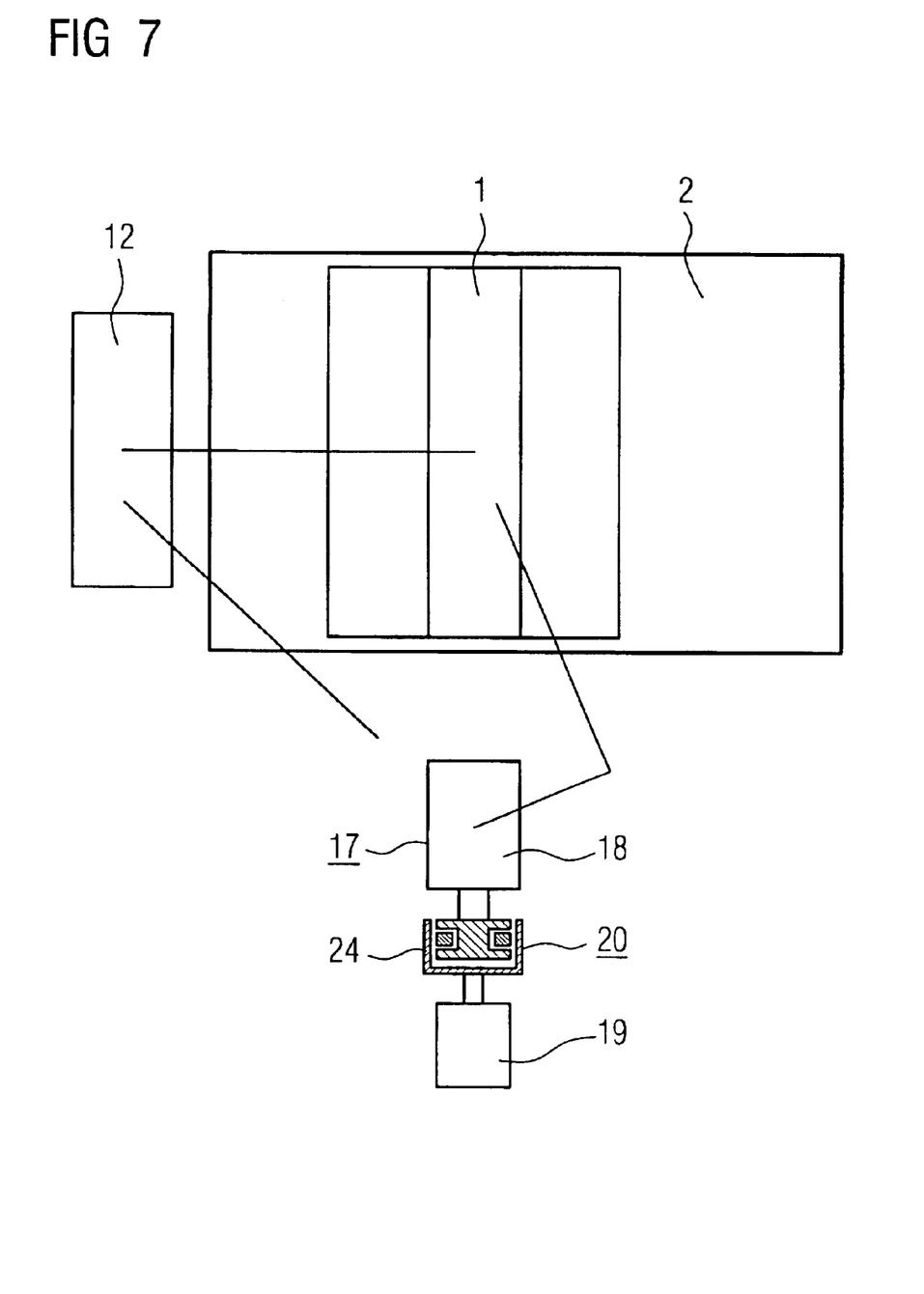
FIG. 7 shows a cross section through the rotary drive.

FIG. 7 shows a cross section through the rotary drive. In this case, a generator or a multistage generator can be installed in the rotor of the wind-driven rotor 1. The generator or else a multistage generator may, however, also be connected via any desired coupling system to the shaft of the wind-driven rotor 1. The illustration in FIG. 7 shows a mechanical coupling 20. However, other coupling systems may also be used, also including self-energizing electromagnetic coupling systems.

Figure 8:
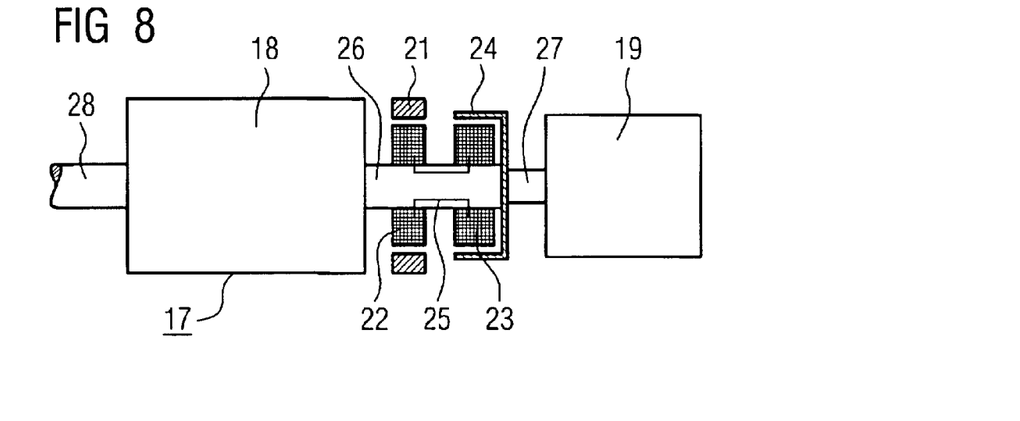
FIG. 8 shows a multistage wind generator 17.

FIG. 8 shows a multistage wind generator 17, in which a self-energizing coupling comprising two parts, the energizing stage 22 and the energized stage 23, is arranged between the first stage 18 and the second stage 19. The energizing stage 22 comprises an iron core and a winding rotating between two permanent magnets 21. The electricity which is generated in the energizing stage can be transmitted in the shaft 26 or else externally on the shaft 26 to the part of the coupling that is to be energized.

The current forms a magnetic field in the energized stage 23, which comprises the iron core and coil. The iron coupling part 24 of the drive shaft of the second generator stage 27 is installed such that it is attracted, and can be driven, by the electromagnetic field that is formed, provided that the magnetic field that is produced is strong enough at a specific rotation speed.

The second generator stage 19 is driven via the drive shaft 27 and the generator 19 runs with it. But it is uncoupled when the rotation speeds fall, when the current and the electromagnetic field become weaker again.

One characteristic feature of the self-energizing electromagnetic coupling system is that the electricity which is generated in the energizing stage 22 is just consumed once again in the energized stage 23 and is dependent on the rotation speed of the generator shaft 26, as well as the rotation speed of the drive shaft 28 of the first generator stage 18. Current is induced by any rotary movement of the drive shaft 28 and of the generator shaft 26. However, it is possible to use a control system to ensure that current is passed from the energizing stage 22 to the stage 23 that is to be energized only when it is sufficient to form a sufficiently strong electromagnetic field to allow attraction of the iron part 24 of the coupling 24.

FIG. 8 also illustrates that the permanent magnets 21 are installed in fixed positions. All winding types may be used both in the energizing stage 22 and in the energized stage 23, but the principle of operation does not change.

Figure 9:
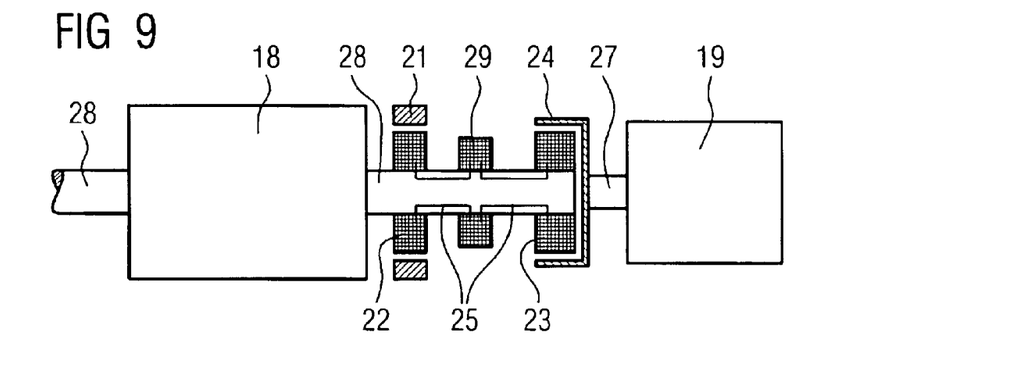
FIG. 9 shows a design option in which a transformer 29 or some other component with the same function is installed between the energizing stage 22 and the energized stage 23 of the self-energizing electromagnetic coupling systems.

FIG. 9 shows a design option in which a transformer 29 or some other component with the same function is installed between the energizing stage 22 and the energized stage 23 of the self-energizing electromagnetic coupling systems. This allows the electricity that is generated to be transformed up. It can also be transformed down when other machine types are used. The permanent magnets are fixed.

Figure 10:
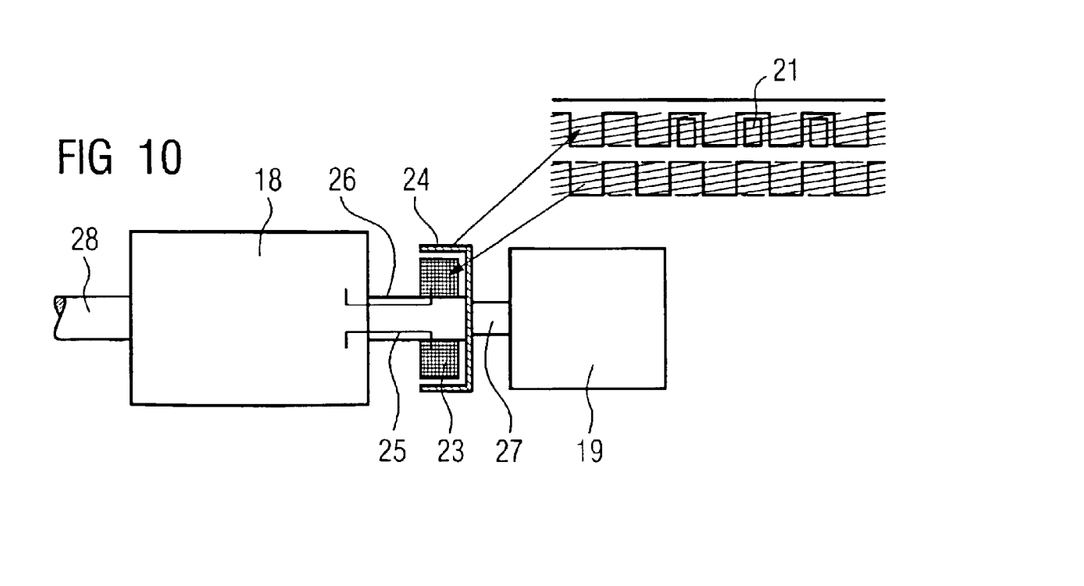
FIG. 10 shows a portion of the electricity that is produced in the first generator stage 18 being tapped off from the coil of the generator 18 for the part 23 of the coupling that is to be energized.

In the embodiment of FIG. 10, a portion of the electricity that is produced in the first generator stage 18 is tapped off from the coil of the generator 18 for the part 23 of the coupling that is to be energized. However, the coupling part 23 operates in the same way as in FIGS. 8 and 9, with the iron part 24 as a coupling for the drive shaft 27 of the second generator stage.

Alternatively, a configuration and a functional variant as a short-circuited system without any energizing current from the generator 18 is also possible, by the installation of an iron core, winding and magnets in the energized part of the coupling 23 and in the iron part 24. The rotary movement of the generator shaft 26 results in a current being induced in the coils by the magnets in the opposite coupling part in the other rotor part, because the rotary movement of the short-circuited system in the other iron part results in an electromagnetic field being formed, which passes into the iron coupling part with the magnets. Further, if the field strength of the electromagnetic field is sufficient, the iron coupling part is drawn with it and the other part is also caused to rotate, although it rotates more slowly as a result of the losses. The energized part 23 and the coupling part 24 have a variable configuration, because both the magnets and the windings can be arranged alternately on them.

All known short-circuited systems may be used. To allow the function to be achieved, the energized part 23 on the generator shaft 26 must run at a higher speed than the coupling part 24 on the shaft of the second generator stage 27.

Figure 11:
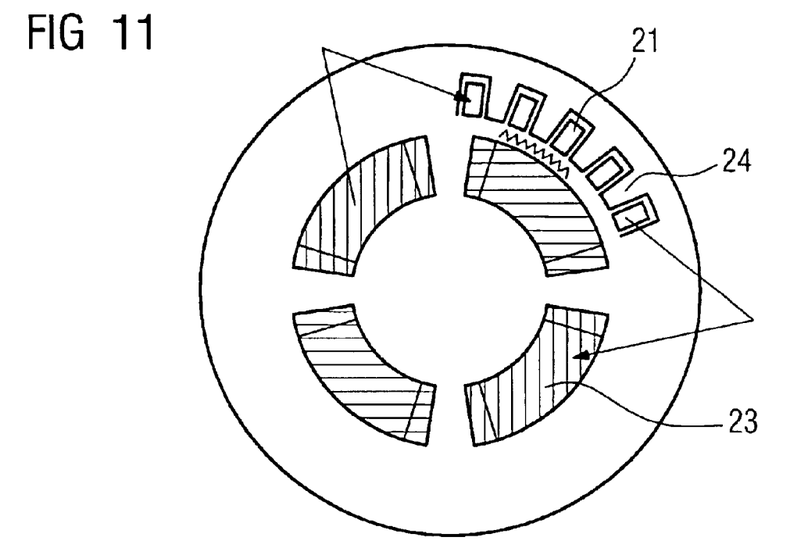
FIG. 11 shows a compact self-energizing electromagnetic coupling.

FIG. 11 shows a compact self-energizing electromagnetic coupling. This includes two parts, the outer part, the iron coupling 24 in which permanent magnets 21 are embedded, and the inner part 23, which may be composed of widely differing types of windings and iron cores. The arrows that are shown indicate that the arrangement of the magnets 21 and of the windings with the iron core may also be reversed.

The rotary movement causes current to be induced in the windings with the iron core by the magnets 21, and the induced current forms a magnetic field around it. This acts on the iron part 24 with the magnets 21. If the strength of the magnetic field is sufficient, the iron part 24 follows the rotary movement and drives the generator shaft of the second stage 27.

FIG. 11 shows a cross section through the outer part and the inner part of the self-energizing coupling.

Figure 12:
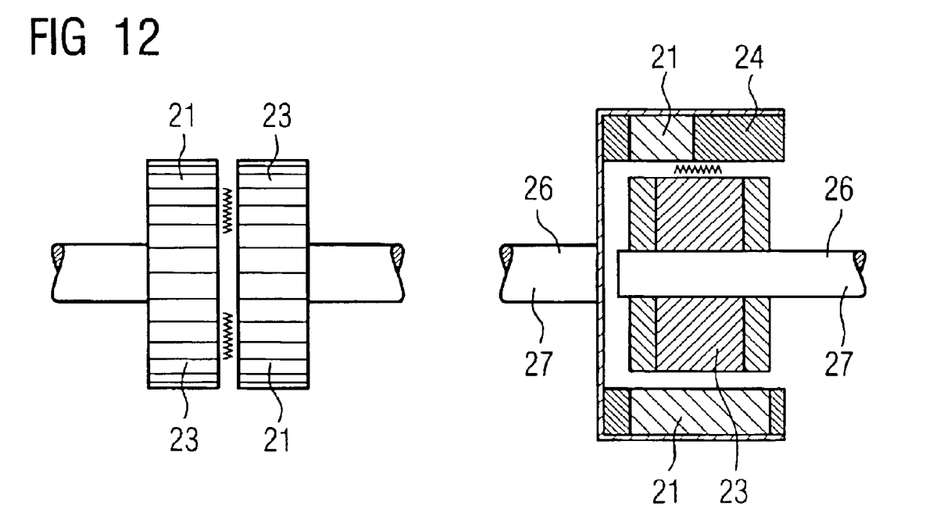
FIG. 12 shows the outline of the configuration of the outer part 24 and of the inner part 23 of the self-energizing coupling.

FIG. 12 shows the outline of the configuration of the outer part 24 and of the inner part 23 of the self-energizing coupling. The outline 12 also shows that the number and the size of the installed magnets and iron cores are variable, although the function does not change at all.

The first illustration in FIG. 12 shows an unshrouded configuration, but an opposite electromagnetic effect between a coil and magnets. The second illustration shows the coil shrouded by an iron core and magnets. The magnetic effect is around the coils. The arrangement of the magnets or coils on the energized part 23 or on the coupling part 24 is variable.

List of Reference Symbols

1. Wind-driven rotor
2. Housing
3. Alignment plates
4. Impact stub
5. Wind inlet opening
6. Exposed zone
7. Adjustable outlet valve
8. Air or wind outlet channel
9. Low-pressure system for accelerating the air extraction
10. Drive shaft
11. Separating plates
12. Generator in the interior of the rotor of the wind-driven rotor
13. Wind-driven rotor with internal wind flow openings
14. Wind blocking zone
15. Wind reversal chambers
16. Moving wind catchment plates on the wind-driven rotor housing
17. Multistage generator
18. Multistage generator, first stage
19. Multistage generator, second stage
20. Mechanical type of coupling
21. Permanent magnets
22. Energizing stage
23. Energized stage
24. Iron coupling part or electromagnetic coupling part with an iron core
25. Energizing current transformer
26. Generator shaft from the first generator stage to the second generator stage
27. Drive shaft for the second stage 19
28. Drive shaft for the first generator stage 18
29. Jointly rotating transformer The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotary drive, used in conjunction with a mechanical and self-energizing coupling system, comprising:
    a wind-driven rotor, adapted to rotate in a housing, the housing including two parts wherein, in one part, wind force at least one of directly strikes blades of the wind-driven rotor and is passed directly to them, and in another part, the housing forms a wind shadow side with at least one wind reversal chamber, into which the wind force is deflected and is passed to the blades of the wind-driven rotor; and
    separating plates.

2. The rotary drive of claim 1, wherein the housing, including restrictions and alignment plates, is adapted to concentrate all of the wind forces captured by the housing, both in an exposed zone and in the area of the wind reversal chambers, onto the blades of the wind-driven rotor.

3. The rotary drive of claim 1, further comprising: at least one adjustable outlet valve, adapted to regulate internal pressure and rotation speed of the wind-driven rotor.

4. The rotary drive of claim 1, wherein, in the area of an exposed zone, alignment plates are adapted to pass the wind force to the blades of the wind-driven rotor and wherein at least one of at least two wind reversal chambers and at least two alignment plates are arranged in a wind shadow area and are adapted to pass the wind force to the blades of the wind-driven rotor.

5. The rotary drive of claim 1, wherein the housing includes wind catchment plates arranged on the housing.

6. The rotary drive of claim 1, further comprising a wind outlet channel.

7. The rotary drive of claim 6, further comprising a reduced pressure system, arranged in the wind outlet channel.

8. The rotary drive of claim 1, wherein shape, size and length of the housing and of the blades, and the number of blades on the wind-driven rotor are variable, and wherein any type of wind-driven rotors is useable.

9. The rotary drive of claim 1, wherein at least two wind-driven rotors are arranged in one housing.

10. The rotary drive of claim 1, further comprising at least one of a generator and a multistage generator arranged at least one of in the interior of the wind-driven rotor and external to the wind-driven rotor.

11. The rotary drive of claim 10, wherein, when using a multistage generator, the generator stages are connected to one another by self-energizing electromagnetic couplings.

12. The rotary drive of claim 11, wherein the self-energizing electromagnetic coupling is used in at least one of areas where it is necessary to step down the rotation speed, for all wind generators irrespective of their blade arrangement, in gas turbines, and in high-speed motors.

13. The rotary drive of claim 11, wherein, in the electromagnetic coupling used, the energizing stage produces current for the energized stage.

14. The rotary drive of claim 1, wherein any type of coupling is useable, including a mechanical and self-energizing electromagnetic coupling.

15. The rotary drive of claim 14, wherein, in the electromagnetic coupling used, the energizing stage produces current for the energized stage.

16. The rotary drive of claim 13, wherein the electromagnetic coupling is designed differently in the form of different types, is formed from at least two components and is compact, with the energizing stage and the energized stage forming a unit.

17. The rotary drive of claim 16, wherein a controller is installed in order to energize the energized stage only at a sufficient rotation speed.

18. The rotary drive of claim 1, useable for at least one of large wind power systems in wind parks, for small versions for use domestically, for camping, in boats, and for maritime purposes.

19. A wind power system including the rotary drive of claim 1.

20. A rotary drive, used in conjunction with a mechanical and self-energizing coupling system, comprising:

a wind-driven rotor, adapted to rotate in a housing, the housing including two parts wherein, in one part, wind force at least one of directly strikes blades of the wind-driven rotor and is passed directly to them, and in another part, the housing forms a wind shadow side with at least one wind reversal chamber, into which the wind force is deflected and is passed to the blades of the wind-driven rotor; and impact stubs, arranged in order to produce vortices in the air flow.

21. A rotary drive, used in conjunction with a mechanical and self-energizing coupling system, comprising:

a wind-driven rotor, adapted to rotate in a housing, the housing including two parts wherein, in one part, wind force at least one of directly strikes blades of the wind-driven rotor and is passed directly to them, and in another part, the housing forms a wind shadow side with at least one wind reversal chamber, into which the wind force is deflected and is passed to the blades of the wind-driven rotor, wherein any type of coupling is useable, including a mechanical and self-energizing electromagnetic coupling, wherein the electromagnetic coupling is designed differently in the form of different types, is formed from at least two components and is compact, with the energizing stage and the energized stage forming a unit, wherein a controller is installed in order to energize the energized stage only at a sufficient rotation speed, and wherein current, produced in the energizing stage, is transformable between the energizing stage and the energized stage.

22. A rotary drive, used in conjunction with a mechanical and self-energizing coupling system, comprising:

a wind-driven rotor, adapted to rotate in a housing, the housing including two parts wherein, in one part, wind force at least one of directly strikes blades of the wind-driven rotor and is passed directly to them, and in another part, the housing forms a wind shadow side with at least one wind reversal chamber, into which the wind force is deflected and is passed to the blades of the wind-driven rotor, wherein any type of coupling is useable, including a mechanical and self-energizing electromagnetic coupling, wherein the electromagnetic coupling is designed differently in the form of different types, is formed from at least two components and is compact, with the energizing stage and the energized stage forming a unit, wherein a controller is installed in order to energize the energized stage only at a sufficient rotation speed, wherein current, produced in the energizing stage, is transformable between the energizing stage and the energized stage, and wherein the current for the energized stage is taken directly from the coil of the generator, in order to activate the energized stage.

* * * * *